United States Patent [19]

Tronsberg

[11] 4,040,163

[45] Aug. 9, 1977

[54] METHOD FOR MAKING A CONTAINER OF COMPOSITE MATERIAL

[75] Inventor: Walter Tronsberg, Munich, Germany

[73] Assignee: Maschinenfabrik Augsburg-Nurnberg Aktiengesellschaft, Munich, Germany

[21] Appl. No.: 591,945

[22] Filed: June 30, 1975

[30] Foreign Application Priority Data

July 5, 1974 Germany .............................. 2432378
Nov. 5, 1974 Germany .............................. 2452311

[51] Int. Cl.² .................... B21D 39/00; B23P 17/00; C23F 1/02
[52] U.S. Cl. ...................................... 29/423; 29/463; 156/630; 156/642; 156/656; 156/665; 156/173; 220/3; 264/37; 264/221; 264/317; 264/DIG. 44
[58] Field of Search ................. 264/37, 221, 317, 257, 264/DIG. 44, 258, 136, 137; 156/3, 7, 18, 19, 22, 155, 173, 175; 29/463, 423; 428/35; 220/3

[56] References Cited

U.S. PATENT DOCUMENTS

| | | | |
|---|---|---|---|
| 2,744,043 | 5/1956 | Ramberg | 220/3 X |
| 3,133,659 | 5/1964 | Dobell et al. | 220/3 |
| 3,312,575 | 4/1967 | Corbin, Jr. | 156/155 X |
| 3,366,522 | 1/1968 | Underwood | 220/3 UX |
| 3,411,999 | 11/1968 | Weinberg | 156/22 X |
| 3,654,009 | 4/1972 | Judd et al. | 264/221 X |
| 3,692,892 | 9/1972 | Lemelson | 264/317 |
| 3,815,773 | 6/1974 | Duvall et al. | 220/3 |

Primary Examiner—Jan H. Silbaugh
Attorney, Agent, or Firm—W. G. Fasse; W. W. Roberts

[57] ABSTRACT

Very light weight containers are made of synthetic resin reinforced by fiber material, such as glass fibers or carbon fibers, by first manufacturing a hollow dimensionally precise core having the shape of the container and including access openings at each end of the container. The composite material is then applied to the prefabricated core and after the setting of the composite material the core is either completely or partially removed by chemical means, which are pumped through the inside of the container to etch away the core, which is, for example, made of aluminum. A very controlled and precise core removal may be accomplished in this manner.

14 Claims, 6 Drawing Figures

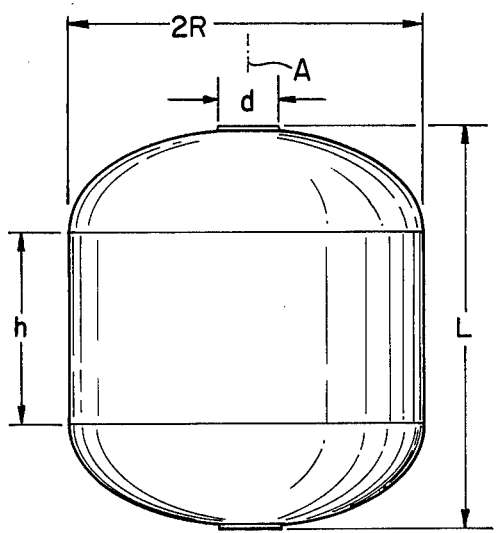
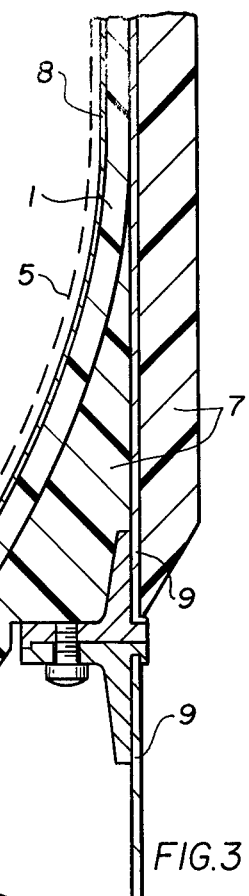
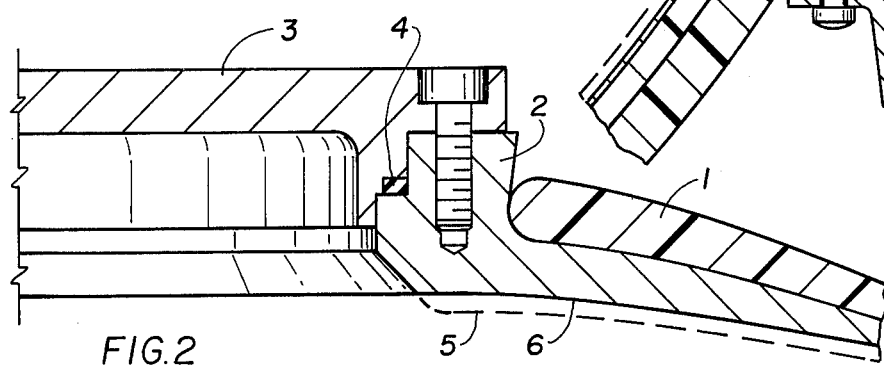
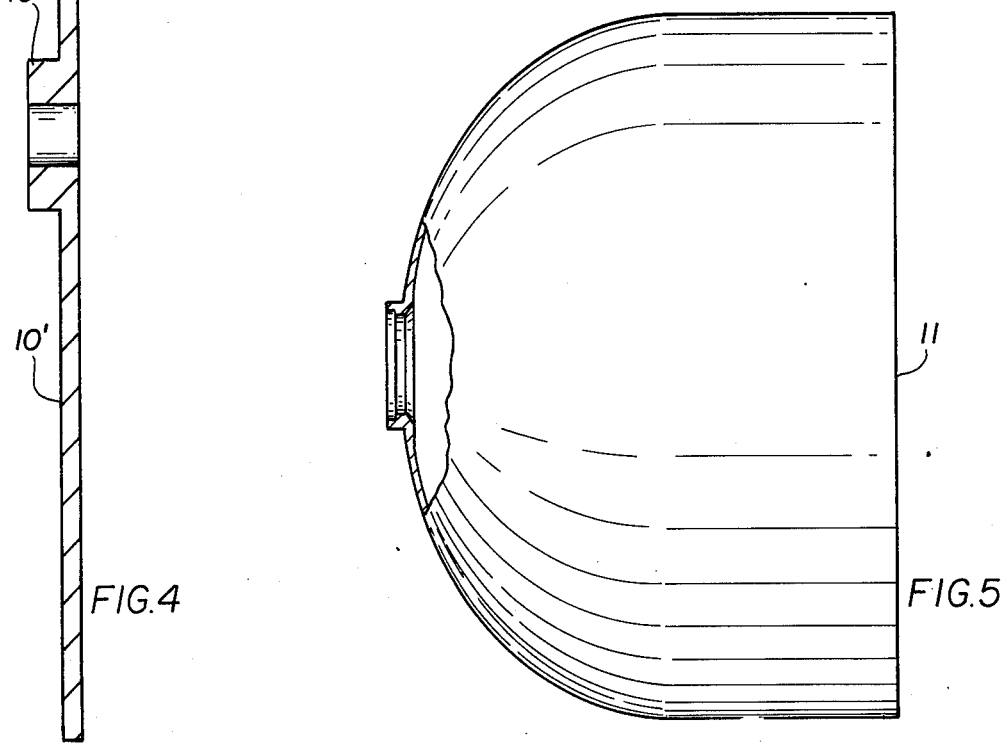

METHOD FOR MAKING A CONTAINER OF COMPOSITE MATERIAL

BACKGROUND OF THE INVENTION

In certain technical fields, for example, in connection with space travel there is a need for extremely light weight and precise containers which at the same time must be of high strength construction. The walls of such containers are made of fiber material, which are wound about a winding core and the spaces between the fibers are filled with a suitable bonding material, as is well known in the art. For example, glass fibers or carbon fibers are used in this connection and the bonding material is usually a synthetic resin, for example, an epoxy resin. Such containers require for their production a relatively stiff, that is, dimensionally precise and dimensionally stable winding core in order to assure the required high precision in the shape of the containers.

Heretofore such containers have been manufactured by first producing sheet metal containers with relatively thin walls, for example, of titanium or aluminum. The sheet metal container served as core onto which the fibrous material has been wound, whereby the sheet metal core became a permanent part of the container wall forming a bond with the fibrous material. Leaving the metal core inside the container has certain disadvantages. On the one hand the metal core increases the weight which is unpermissible in many instances. On the other hand, the metallic inner surface of the container limits the use of the container in an undesirable manner, for example, where the container content would attack the inner metal wall.

In order to avoid the above disadvantages of prior art containers of this type attempts have been made to employ divisible cores which may be reused. Such cores comprise a plurality of individual segments which are held in proper position relative to each other by spacer means. The fiber material is then wound onto the core which is subsequently disassembled in the finished container and the individual core elements or components are removed through end openings or access openings of the container. Such cores by their very nature are extremely expensive and in addition their usefulness is limited because it is not possible to vary as desired the ratio between a core segment and the diameter of an axis or end opening of the container. These openings may be relatively small and it is economically not feasible to separate the core into a large number of sufficiently small segments, especially since such cores are very precise tools which lose their dimensional precision after having been used several times, because resin fragments may stick to the core segments and such resin fragments must be removed prior to reusing the core segments. Thus, this prior art method of employing segmented reusable cores is rather expensive and generally not satisfactory.

In another prior art method so called lost cores were produced, for example, of quartz sand or hollow glass beads. After completion of the container wall, that is, after setting and, if desired, after finishing the outside of the container wall, the lost core would be destroyed and removed through the container openings. Such method is also very expensive because several cores must be produced for each container until the core finally has the desired dimensional or shape precision. An additional disadvantage of this method resides in the fact that a relatively high percentage of rejects must be taken into account, which also increases the costs.

Another disadvantage of the just described prior art methods is seen in that it is rather difficult to integrate into the wall structure of the container any wall elements, for example, inner reinforcing ribs or flanges forming access openings at the ends of the containers. Such containers in the course of their use are subject to very high internal pressures. Therefore, any structural elements forming an integral part of the wall structure of the container must be overlapped by the high strength composite wall material.

OBJECTS OF THE INVENTION

In view of the foregoing description of the prior art, it is the aim of the invention to achieve the following objects singly or in combination:

to provide a method for the production of containers of the type described above in a highly precise manner and nevertheless economically;

to provide a method for the production of high precision light weight containers which will permit the integration of additional structural elements into the wall structure of the container in a simple and economical manner;

to employ cores which may be removed by chemical or electrochemical means;

to provide protective means which will assure a high precision control of the chemical core removal so that upon the complete removal of the core by the chemical means or by the chemical etchant bath, the composite container wall material will not be attacked and/or destroyed;

to control the core removal with precision not only over the entire surface area of the core, but also in selected areas so that certain core portions may become integral elements of the container;

to provide a method for the production of container made of a composite material which are substantially lighter in their weight than was possible heretofore; and to circulate an etchant through the hollow core in the container in such a manner that a controlled core removal is assured while simultaneously protecting the composite material container wall on the inside and outside thereof against any chemical attack.

SUMMARY OF THE INVENTION

According to the invention there is provided a method for the production of high precision light weight containers of a composite material which comprises manufacturing a hollow, dimensionally precise winding core to the outside of which the composite material forming the container wall is applied. A finishing step may be employed to finish the outside of the container wall and thereafter the core is removed either completely or partially by chemical or electro-chemical means. In this context it is to be understood, that the term "chemical" is intended to include in its connotation the meaning of "electrochemical".

In order to protect the composite material wall of the container from the attack by the chemical etchant which is employed in the core removal, there is further provided according to the invention a masking layer applied to the outside of the core prior to applying the fiber reinforced material to the outside surface of the core so that the masking material will be located intermediate the core material and the composite container wall material to provide a protective layer.

The method according to the invention permits the production of light weight containers with any desired precision, because it is now possible to manufacture the hollow core body with any desired precision and the means employed for the production of the hollow core bodies may be selected from a large number of possibilities depending on the particular requirements. Further, the material for the hollow core body may also be selected from a wide range of available, suitable material, the only limitation being the availability of respective chemical etchants.

After the composite material container wall has been applied to the hollow core, for example, by winding the fibers onto the core and filling the spaces between the fibers with a still unset synthetic resin, for example, an epoxy resin, the hollow core is chemically removed after the composite material has set and if desired, also after the outer surface of the container has been finished. The method of the present invention is rather versatile, because it permits a wide range of choices. Thus, the removal zones may be controlled, the wall thickness of the hollow core body may be varied in different zones of the core, the particular method of chemical removal may be selected in accordance with the size and/or shape of any particular container, and the materials for the core may be selected from a wide variety of possible materials, depending on the chemical etchant to be employed. Further, additional elements may be attached to or form part of the hollow core body in a simple manner so that after the chemical removal of the hollow core body these additional elements will become an integral part of the container wall. In connection with an electro-chemical core removal it is possible to control certain areas by respectively placing correspondingly shaped electrodes into an operational relationship relative to the hollow core. Where an etchant flow is employed, the core removal may be controlled by the etchant concentration as well as by the throughput of etchant flow.

BRIEF FIGURE DESCRIPTION

In order that the invention may be clearly understood, it will now be described, by way of example, with reference to the accompanying drawings, wherein:

FIG. 1 illustrates a container of the general type as produced by the present method;

FIG. 2 shows a partial sectional view axially through the container of FIG. 1 on an enlarged scale showing specifically the construction of one of the two access openings of the container;

FIG. 3 is also a sectional view of a section of a wall portion of a container according to the invention;

FIG. 4 illustrates a sheet metal blank having attached a flange, said blank being suitable for manufacturing the hollow cores employed according to the invention, for example, by a deep drawing process;

FIG. 5 shows one half of a core prepared from a sheet metal blank as shown in FIG. 4.

Figure 6:
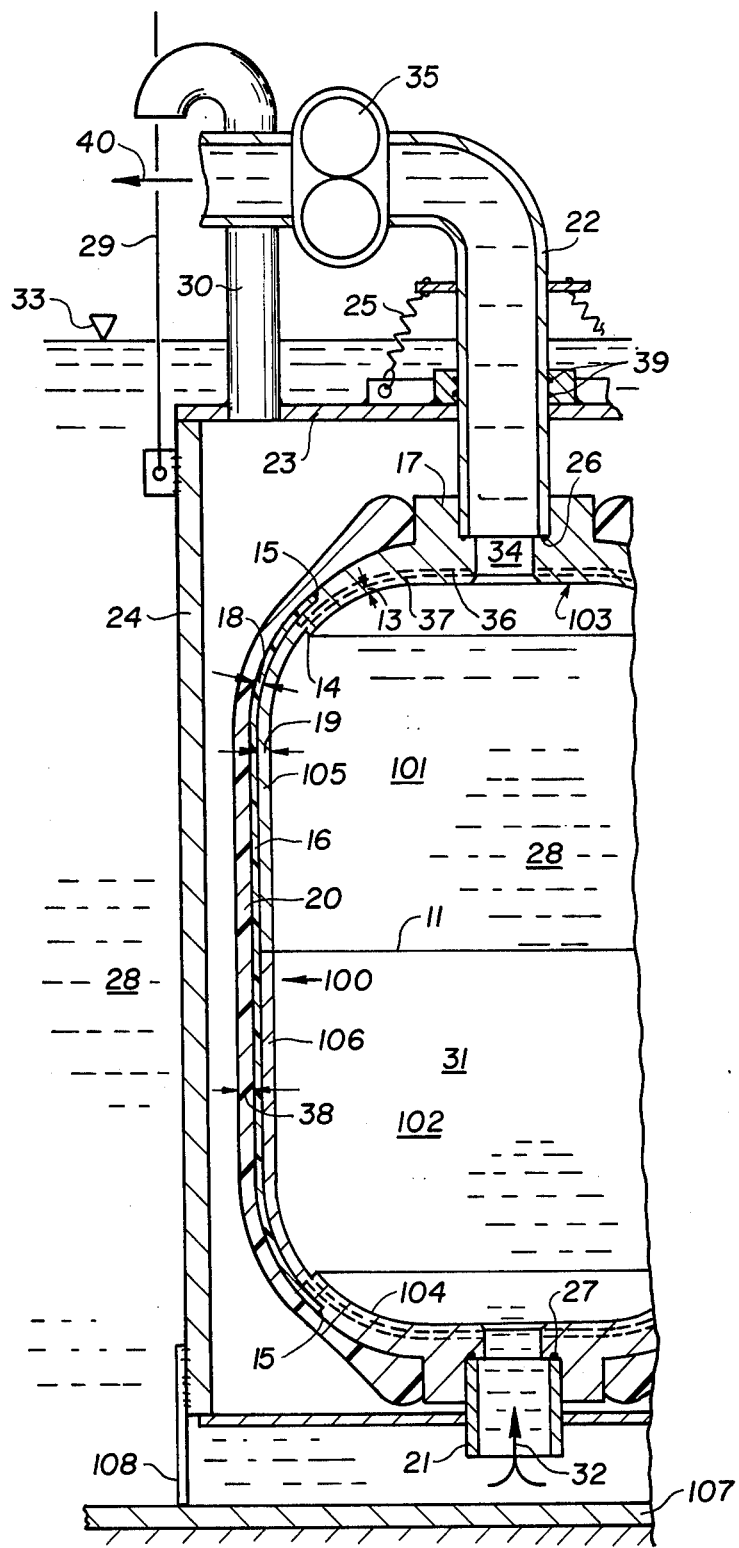
FIG. 6 shows a sectional view through an apparatus which may be employed in practicing the present method.

DETAILED DESCRIPTION OF EXAMPLE EMBODIMENTS:

FIG. 1 shows a container of rotational symmetry relative to the longitudinal axis A—A. The wall of the container is made substantially of synthetic resin reinforced by fibers. The synthetic resin may, for example, be one known as Araldite (Diglycidyl 'A'ther Bisphenol "A" Epichlorhydrin) Harter (Polyamidoamin) Firma; Ciba Geigy. The fiber material may, for example, be of the glass fiber or carbon fiber type. The container, for example, may have an outer diameter 2R corresponding to 560 mm and a height L corresponding to 675 mm. Each end of the container is provided with access openings having a diameter $d$ corresponding to 110 mm. The length of the cylindrical container portion $h$ is 300 mm. The just given dimensions are to be understood as examples only and the present method is suitable for producing containers of any desirable dimensions.

FIG. 2 shows on an enlarged scale a partial sectional view of the opening area of a container according to the invention. The container wall 1 of carbon fibers bonded by a synthetic resin reaches all the way to a flange or collar 2 which in turn extends inwardly to form part of the container housing thus reinforcing the end portions of the container. A cover 3 is secured, for example, by screws to the flange 2. A sealing gasket 4 may be arranged to rest on a shoulder of the flange 2 and held in position by a respective cooperating shoulder of the cover 3. The dashed line 5 indicates the wall thickness of the flange 2 inwardly of the container prior to the application of the etching method as taught according to the invention. The inner surface 6 of the flange 2 inside of the container remains as a reinforcing member of the container ends after the etching.

FIG. 3 illustrates a partial section through a wall of a container according to the invention. The container wall 1 is insulated on the outside by a layer 7 of a foam material, for example, polystyrene. The inner surface 8 of the container wall 1 is a relatively thin metal layer which remains after the etching. In other words, initially the metal core has a thickness as indicated by the dashed lines 5 and the etching is controlled according to the invention so as to leave a thin metal coating on the container wall 1. The original thickness of the metal core was selected to provide a sufficient dimensional stability of the core when applying the fiber material and the bonding material, for example by winding the fibers onto the core and immersing the fibers into the bonding material. According to the invention the etching is continued until merely a thin coating layer 8 of metal remains for the purpose of lining the container wall proper. For example, the core may be made of aluminum as will be described in more detail below. If desired, a stand-up collar 9 may be secured to the wall 1 and also to the outer foam layer 7 by conventional means.

FIG. 4 illustrates a blank 10' of sheet metal provided with a flange 10 which is centrally located in the round sheet metal blank 10' and which is provided with an access bore, as described with reference to FIG. 1. The blanks 10' may, for example, be produced foam standard stock material on a lathe. The masking material: Coverlac (styrol-Butadien-Skyrad Fan: Allgemeine Industrie Comerv. W.V. Weizenbeck.

FIG. 5 shows a core section representing one symmetrical half of a complete core. The half section is produced by deep drawing from a plate as illustrated in FIG. 4. It will be noted that the wall portions adjacent to the flange 10 and the flange 10 itself have a substantially larger thickness than the remaining wall portions of the deep drawn core section. Two identical core sections as illustrated in FIG. 5 are then welded to each other along the line 11, whereby the hollow core according to the invention is produced. As mentioned, the core is then provided in accordance with the present teaching, with a fiber filler bond material layer and thereafter the core is removed chemically or electro-chemically either completely or partially.

FIG. 6 illustrates an apparatus for performing the method according to the invention, whereby the chemical core removal action has not yet started in the illustration.

The hollow core 100 is manufactured, for example, from aluminum, by a forming which generally avoids milling, for example by deep drawing. However, a subsequent finishing operation, for example, turning on a lathe may be employed after two half sections as shown in FIG. 5 have been welded together along the welding seam 11. The turning on a lathe will assure that the core has the outer dimensions which are required for the container. Each core half section 101 and 102 comprises an end portion 103, 104 as well as a cylindrical portion 105, 106. The end portion 103 increases in diameter and gradually merges into the cylindrical portion 105. Similarly, the end portion 104 merges into the cylindrical portion 106. The end portion 103 comprises an axially extending flange with a central bore 34. The bore has two different diameters interconnected by a shoulder. The same applies for the end portion 104. The cylindrical portions 105, 106 may, for example, have a diameter of about 200 to 700 mm. Compared to this diameter of the core the access opening 24 is relatively small having a diameter of about 30 to 60 mm. Starting at the flange 17, the wall thickness of the end portion gradually decreases toward the cylindrical portion. In addition there is provided a shoulder 14 on the inner surface of the core generally in the region where the end portion merges into the cylindrical portion. Another shoulder 15 is provided on the outer surface slightly above the region where the end portion merges into the cylindrical portion, which has a wall thickness 19. In order to provide for the shoulder 14 each end portion is provided with an additional wall thickness 13, as indicated by the dash dotted line 37. This additional thickness may, for example, be about 1 mm. In order to provide for the shoulder 15 each end portion has an outer additional wall thickness 18, which may be about 0.5 mm. The two shoulders 15 on the outer surface of the core 100 provide a recess so to speak extending around the entire cylindrical portion of the core and also over the core areas where the end portions merge into the respective cylindrical portion, since the upper shoulder 15 is located slightly above the merging area whereas the lower shoulder 15 is located slightly below the merging area. The wall thickness 19 of the cylindrical core portions corresponds to about 3.5 mm excluding the depth 18 of the just described recess, which is filled with a masking layer 16 subsequent to the welding of the two half sections along the welding seam 11. The masking layer may, for example, be a so called cover lacquer of the type SC-285-20-4 sold by the firm Spraylat. Also the lacquer known under the trade name "Dabcout" of the type 1001 sold by the firm Deutz Aircraft and a lacquer known as "Turco Lack" Type 545 would be suitable for the present purposes. Of course, depending on the type of etchant used, those skilled in the art will be able to select the required masking material, which will be acid resistant, as well as suitable for prolonged storage.

The masking of the layer 16 partially overlaps the increased wall thickness area of each end portion 103, 104 adjacent to the shoulder 14.

The compound or composite material forming the container wall 20 having a thickness 38 is then applied to the core so that the protective masking will be entirely covered and so that the composite material reaches all the way of the flanges 17. This step may be accomplished, for example, by first immersing the fibers into the sticky bonding resin compound and then winding the fiber material onto the core, whereupon the so wound composite material is cured to permit the bonding material to harden. The wall thickness 38 of the compound container forming material extends substantially over the entire length of the container, except in the areas adjacent to the flanges 17. The wall thickness may, for example, be 3.5 mm in the area of the cylindrical container wall portions and increasing in thickness to substantially the height of the flanges 17 adjacent thereto.

It has been found that making the end portions 103, 104 to have a relatively large wall thickness within the range of 2 to 5 mm, for example, 3.5 mm has a number of advantages as compared to a wall thickness, for example, only within the range of about 0.2 to 1 mm. In the latter instance, substantial difficulties were encountered in the manufacturing of the hollow core. For example, warping occurred as a result of mechanical working and the heat dissipation was too slow and unsatisfactory during the welding. Moreover, the pressures applied for a non-milling type of working became too large, for example, when roller stretching and/or flow pressing the material. In addition, an insufficient stiffness against depending as a result of the winding was observed in connection with wall thickness of 0.2 to 1 mm. These disadvantages have all been overcome according to the invention by making the end portions 103, 104 to have the described wall thickness in a range of about 2 to 5 mm.

Subsequent to the curing or hardening of the container wall 20, the entire unit including the container wall 20 and the core 100 is inserted into a housing 24 in such a manner that the shoulders in the access openings 34 engage respective pipe sections 21 and 22. Sealing gaskets 26 and 27 are arranged between the respective shoulder and the corresponding pipe section 22, 21 as shown in FIG. 6. Thus, the space inside the core 100 becomes part of a closed loop etchant circulation circuit including an etchant bath 28 in a container 107 only the bottom of which is shown in FIG. 6 for simplicity's sake.

The housing 24 is closed by a cover 23 through which the outflow pipe 22 extends in a sealed manner. The sealing is accomplished by sealing rings 39 between the pipes 22 and a respective flange in the cover 23. The inlet pipe 32 communicates with the bath 28 and spring means 25 urge the pipe 22 against the shoulder in the upper flange 17 of the container end portion 103, thus urging the entire unit against both seals 26, 27 and pipe section 21. A venting pipe 30 vents the interior of the housing 24 to the atmosphere. The cover 23 is, for example, screwed to the housing 24 in a liquid tight manner.

After closing the housing 24 in the manner described it is immersed into the bath 28, for example, by means of ropes 29 secured to the housing 24. The housing 24 then rests on the bottom 107 of the bath container by means of legs 108 so as to space the pipe section 21 from the bottom of the container 107 to provide for a free flow of the etchant into the space 31 in the core 100 as indicated by the arrow 32. As a result, the inside space 31 is completely filled with etchant which rises to the level 33 of the bath 28 and the closed loop circulation of the etchant is started immediately upon the filling of the space 31 by starting a gear pump 35. The return flow is indicated by the arrow 40. Incidentally, the just described arrangement has the advantage that no masking is necessary on the outside of the wall 20, because the etchant is prevented from entering into the housing 24. Moreover, the spring arrangement 25 and the sealed gliding of the pipe 22 up and down provides an effective means for compensating any axial expansions and contractions of the unit as a result of temperature changes. The etchant is then circulated through the just described closed loop circuit until the desired wall thickness of the core has been removed, for example, to the extent of 3.5 mm. Due to the pump controlled circulation, it is possible to provide a relatively large flow speed of the etchant through the inner core space 31. Such flow speed in conjunction with the relatively small container openings 34 provide for a whirling of the etchant inside the core and thus a highly precise material removal, which may be precisely controlled by the flow speed and/or etchant concentration. In other words, the arrangement of the pump as shown is advantageous as compared to an arrangement operating without a pump, whereby merely a pump effect is accomplished as a result of the chemical reaction of the metal, whereby two openings 34 would be vertically aligned as shown, however, the upper opening would be larger than the lower opening.

Another advantage of the invention is seen in that the material removing or etching can be interrupted at any time, for example, to measure the wall thickness by ultrasonic means. Thus, it is also possible to stop the etching process, for example, to leave an inner lining of metal on the container wall. However, the etching will normally be stopped when all the portions of uniform wall thickness have been removed. At that instant the end portions 103, 104 are also etched down to the dashed line 36. As a result, the only remaining portions of the core are the end portions which become part of the container. Due to the masking layer 16 the etchant is prevented from attacking the composite wall material of the container wall 20. Even in the end portions the etchant cannot attack the container wall proper due to the above described overlap all the way to the shoulders 15.

When the etching is completed, the entire housing 24 is removed from the bath 28, whereby the etchant flows out of the pipe section 21 and back into the container 107. Once the container is removed from the housing 24, the masking layer 16 may be removed mechanically, for example, by sand blasting the inside of the container, or the masking 16 may be removed by a suitable solvent for the masking material. The core portions 103, 104 not only reinforce the container ends, but also provide flanges for closing the container or for connecting the container to any desired structure.

The masking lacquer 16 is, for example, applied to the core by means of a paint brush or spray gun. In any event, the masking material or lacquer will be selected to resist the etchant which in turn will be selected in accordance with the material of the core. Where the latter is aluminim, for example, the etchant may be soda lye, comprising about 100 grams of NaOH to one liter of water and 5 grams of sodium gluconate ($NaC_6H_{11}O_7$) for each liter of water and the etching temperature will be about 86° C. The etching step is preferably followed by a neutralization step, which may be accomplished by immersing the unit into nitric acid at a temperature of about 30° C. Another suitable etchant would be ferric chloride $FeCl_3$, whereby the etching temperature would be about 43° C. Still another suitable etchant would be diluted hydrochloric acid, whereby a 20% solution would be suitable containing about 1 part by weight of HCl and four parts by weight of $H_2O$, whereby the etching temperature would be about 22 to 65° C.

Further with reference to FIG. 6, it will be appreciated that the end portions 103, 104 which after the etching remain as integral parts of the finished container, may be provided either by initially providing an increased wall thickness which is etched away to the extent that the flange 17 and the downwardly reaching reinforcing extension of the flange 17 remain after the etching. In an alternate embodiment the reinforcing end portions may be coated with a protective layer which will not be attacked by the etchant. In this instance the additional wall thickness is not required. In a further embodiment, the end portions may be made of a material which itself is not attached by the etchant. Ceramic would be a suitable material in this context.

The protective layer 16, especially when it extends in the overlapping relationship all the way to the shoulders 15, as shown in FIG. 6, has the advantage that it prevents any creeping action of the etchant. Such creeping action may effectively be prevented if the overlapping end portions of the protective layer 16 extend just a small distance beyond each shoulder 14. Such relatively small overlap as shown, has the further advantage that it does not interfere with a good bond between the composite material of the container wall and the end portion 103, 104 adjacent to the flange 17. As mentioned, the protective layer 16 is removed after the completion of the etching by mechanical or by chemical means. In those instances where it is intended to leave a thin metal coating on the inside surface of the container wall, it will not be necessary to employ the protective masking layer 16.

Summarizing, the winding core 100 shown in FIG. 6 may be made of a plurality of materials preferably metals, whereby it has been found that aluminum is especially suitable. The material strength of the core should be just sufficient to avoid denting when the fibrous material is wound under tension onto the core. Metals, especially aluminum, are rather suitable in this respect, since metals may be shaped by various well known means. Further, portions of the metal core may become integrated parts of the finished container. This is particularly so where aluminum is used, because due to its light weight aluminum parts which become integrated into the container will not result in a weight increase of the finished container. The use of a metal core has the further advantage, that the removal may be stopped just prior to the complete removal of the metal core so as to leave a thin metal layer on the inner surface of the container wall. Such metal layer would, for example, take the position of the masking layer 16, as shown in FIG. 6, and such very thin metal layer or rather coating does not have to be resistant to denting as was necessary heretofore, because the denting resistance is provided by the sturdier core used initially when winding the fibrous material onto the core. Subsequent to the winding and curing or hardening of the container wall, the denting resistance is no longer necessary.

The present method may also be performed by galvanic etching, which has the additional advantage that the electrodes may be placed so as to localize the material removal. In this manner it is possible to leave portions of the metal core as integral parts of the container, for example, in the form of ribs or grid structures. The same effect may be achieved by the etching method illustrated in FIG. 6 by simply providing a protective masking on the inner surface of the metal core 100 in the areas which shall not be removed. Such masking may have the form of the ribs or grid structure intended to remain as part of the finished container.

It has been found to be especially advantageous to employ the etching operation described above, and to assure a large etchant throughput capacity by respectively dimensioning the pump 35. The use of a large throughput capacity of the etchant has two advantages. On the one hand it assures a uniform material removal throughput the internal surface of the core. The other advantage of a large etchant throughput capacity is seen in that the etchant concentration may be lower so that no damage of the workpiece will result, for example, when there should be an apparatus failure, and etchant should remain inside the container. Such low concentration etchant would lose its effectiveness after a short time. Thus, no substantial non-uniform localized material removal can occur even if an apparatus failure should happen.

The placing of the workpiece into a protective housing 24, as shown in FIG. 6, has been found to be rather efficient and economical, since the housing can be reused. However, it is also possible to coat the outer surface of the workpiece with a protective lacquer layer, which will not be attacked by the etchant. Then the housing 24 would not be required. The etchant flow circulation would be the same. As mentioned above, such protective lacquer or masking may also be applied to the inside of the core 100, if it is desired to keep certain portions of the metal core as integral parts of the finished container. The housing 24 may be made of V2 A-steel ($\times$ 10 Ni Co. Mo Ti 18g).

The above described flow circulation of the etchant through an inlet port and through an outlet port has the advantage that an efficient and rapid material removal may be accomplished even if these ports are rather small. Such rapid material removal is also very precise resulting in a very economical operation, as compared to prior art methods.

In view of the foregoing description it will also be appreciated that the retaining of certain metal core portions as integral parts of the finished container may simply be accomplished by providing an increased wall thickness in those areas which are not to be removed completely. Such increased wall thickness may be provided not only at the end portions as shown and described with reference to FIG. 6, but also in any other shape, for example, in the form of reinforcing ribs or grids and the like. Yet another possibility to integrate portions of the core and finished container would be to make such portions initially from material which would be resistant to the etching.

The above described method of making the metal core from two round sheet metal blanks by deep drawing, as illustrated in FIGS. 4 and 5, is especially economical, since the sheet metal blanks may be provided with the flanges in a mass production process, for example, by turning and the blanks may be deep drawn in the same die, because both core half sections are identical to each other. The flange will also be provided with the central access opening.

In addition to the above enumerated advantages of the invention, a further important advantage of the invention is seen in that the present containers are substantially lighter in weight than was considered to be possible heretofore.

Although the invention has been described with reference to specific example embodiments, it is to be understood, that it is intended to cover all modifications and equivalents within the scope of the appended claims.

What is claimed is:

1. A method for producing a container made of composite material including a fibrous component and a bonding filler component, comprising the steps of manufacturing a hollow, dimensionally precise core having the shape of said container and including access openings, applying said composite material to said core, then permitting said composite material to set, and then chemically removing said core by enclosing said container and core in a protective housing in a sealed manner, connecting, also in a sealed manner, a closed loop removal agent circulating circuit to said access openings, immersing said protective housing with said container sealed therein into a removal agent bath which forms part of said closed loop circuit, and circulating a removal agent in said circuit until said core or portions thereof have been removed through said access openings from the inside of said container.

2. The method of claim 1, wherein said step of circulating a removal agent in said circuit comprises maintaining the circulating of said removal agent in said circuit until said core in regions thereof away from said access openings has been completely removed through said access openings from the inside of said container, whereby said core remains only in the regions thereof surrounding said access openings.

3. The method of claim 1, wherein said step of chemically removing said core comprises an electrochemical removal of core material.

4. The method of claim 1, further comprising subjecting the outer surface of the set composite material to a finishing operation prior to said step of chemical core removal.

5. The method of claim 1, wherein said hollow, dimensionally precise core is made of metal, wherein said step of applying said composite material to said core comprises winding carbon fibers onto said metal core, and wherein said bonding filler component is a synthetic resin.

6. The method of claim 1, comprising making said hollow, dimensionally precise core of aluminum, and using as said synthetic resin an epoxy resin.

7. The method of claim 1, comprising using as said removal agent bath an etchant.

8. The method of claim 1, wherein said step of manufacturing a hollow dimensionally precise core comprises deep drawing two round sheet metal blanks to form two respective half core bodies, and welding said half core bodies to each other along the edges thereof.

9. The method of claim 8, further comprising a step of providing each of said round sheet metal blanks prior to said deep drawing with a respective centrally located flange having one of said access opening therein.

10. The method of claim 1, further comprising applying a protective layer to the outer surface of said hollow, dimensionally precise core prior to said step of applying said composite material to said core, whereby said protective layer protects said composite materials during said step of chemically removing said core.

11. The method of claim 10, further comprising removing said protective layer after said core removal step is completed.

12. The method of claim 11, further comprising providing said core with end portions having flanges with said access openings therein, which end portions become part of the finished container, and wherein said step of applying said protective layer to the outer surface of said core extends said layer at least partially onto the end portions of said core.

13. The method of claim 12, wherein said step providing said core with end portions comprises dimensioning said end portions to have an excess wall thickness to that subsequent to said chemical core removal said end portions remain at least partially as part of the finished container.

14. The method of claim 1, further comprising dimensioning said hollow core so that predetermined core portions adjacent said access openings become integral elements of said container after said chemical core removal.

* * * * *